(12) United States Patent
Yoshida et al.

(10) Patent No.: US 11,089,931 B2
(45) Date of Patent: Aug. 17, 2021

(54) FAN UNIT AND CLEANER HAVING THE SAME

(71) Applicant: Samsung Electronics Co., Ltd, Suwon-si (KR)

(72) Inventors: Minoru Yoshida, Kanagawa (JP); Takeaki Ashimori, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 494 days.

(21) Appl. No.: 15/913,607

(22) Filed: Mar. 6, 2018

(65) Prior Publication Data

US 2018/0249873 A1    Sep. 6, 2018

(30) Foreign Application Priority Data

Mar. 6, 2017    (JP) .............................. JP2017-041211
Dec. 28, 2017    (KR) ........................ 10-2017-0181908

(51) Int. Cl.
*A47L 9/28*    (2006.01)
*F04D 25/06*    (2006.01)
(Continued)

(52) U.S. Cl.
CPC ............... *A47L 9/2842* (2013.01); *A47L 5/24* (2013.01); *A47L 9/22* (2013.01); *A47L 9/2831* (2013.01); *F04D 17/025* (2013.01); *F04D 17/12* (2013.01); *F04D 19/024* (2013.01); *F04D 25/06* (2013.01); *F04D 25/0606* (2013.01); *F04D 25/08* (2013.01); *F04D 29/327* (2013.01);
(Continued)

(58) Field of Classification Search
CPC . A47L 9/2842; A47L 9/22; A47L 5/24; A47L 9/2831; F04D 17/025; F04D 17/12; F04D 19/024; F04D 25/0606; F04D 25/06; F04D 29/327; F04D 25/08; H02K 16/02; H02K 7/14; H02K 11/21; H02K 2213/03
See application file for complete search history.

(56) References Cited

U.S. PATENT DOCUMENTS

| | | | |
|---|---|---|---|
| 4,896,065 A | 1/1990 | Tsuyama | |
| 5,945,766 A | 8/1999 | Kim et al. | |

(Continued)

FOREIGN PATENT DOCUMENTS

| | | |
|---|---|---|
| CN | 87100198 A | 8/1987 |
| CN | 2484691 Y | 4/2002 |

(Continued)

OTHER PUBLICATIONS

International Search Report dated Jun. 28, 2018 in connection with International Patent Application No. PCT/KR2018/002632.

(Continued)

*Primary Examiner* — David Redding

(57) ABSTRACT

A fan unit in which a structure of a fan and a driving source thereof is improved to realize stable and high-efficient fan driving, thereby obtaining a high suction force in a stick type electric cleaner. The fan unit installed in a stick type electric cleaner includes a first fan and a second fan disposed in a line on the same rotation axis and a driving motor configured to drive the first fan and the second fan. The second fan is configured to be rotated in a direction opposite of a direction in which the first fan is rotated.

16 Claims, 16 Drawing Sheets

(51) Int. Cl.
*F04D 29/32* (2006.01)
*H02K 16/02* (2006.01)
*F04D 25/08* (2006.01)
*F04D 19/02* (2006.01)
*A47L 5/24* (2006.01)
*H02K 7/14* (2006.01)
*F04D 17/02* (2006.01)
*F04D 17/12* (2006.01)
*A47L 9/22* (2006.01)
*H02K 11/21* (2016.01)

(52) U.S. Cl.
CPC .............. *H02K 7/14* (2013.01); *H02K 16/02* (2013.01); *H02K 11/21* (2016.01)

(56) References Cited

U.S. PATENT DOCUMENTS

| | | | |
|---|---|---|---|
| 6,153,959 A | 11/2000 | Lorenzo | |
| 6,232,696 B1 | 5/2001 | Kim et al. | |
| 6,316,858 B1 * | 11/2001 | Phillips | H02P 5/74 310/114 |
| 7,342,339 B2 | 3/2008 | Norell et al. | |
| 7,466,053 B1 * | 12/2008 | Radev | H02K 1/32 310/114 |
| 8,575,880 B2 * | 11/2013 | Grantz | H02P 25/188 318/724 |
| 9,419,497 B2 * | 8/2016 | Kim | H02K 21/12 |
| 10,008,893 B2 | 6/2018 | Nigo et al. | |
| 10,716,440 B2 * | 7/2020 | Yoshida | A47L 5/28 |
| 2007/0052312 A1 | 3/2007 | Stanetskiy et al. | |
| 2014/0086761 A1 | 3/2014 | Abe et al. | |
| 2015/0303782 A1 * | 10/2015 | Blevins | H02K 21/24 310/68 B |
| 2017/0037865 A1 * | 2/2017 | Shimizu | F04D 29/284 |
| 2017/0325642 A1 * | 11/2017 | Gao | E01H 1/08 |
| 2018/0360278 A1 | 12/2018 | Yoshida et al. | |

FOREIGN PATENT DOCUMENTS

| | | | |
|---|---|---|---|
| CN | 101015111 A | 8/2007 | |
| CN | 203691303 U * | 7/2014 | ............... A47L 5/22 |
| CN | 105531910 A | 4/2016 | |
| EP | 3318167 A1 | 9/2018 | |
| JP | 2008-169725 A | 7/2008 | |
| JP | 4566175 B2 * | 10/2010 | .......... D06F 37/304 |
| JP | 2015159841 A | 9/2015 | |
| JP | 2017-012731 A | 1/2017 | |
| KR | 10-0213571 B1 | 8/1999 | |
| KR | 10-0603207 B1 | 7/2006 | |
| KR | 100663641 B1 * | 1/2007 | ............... H02K 1/30 |
| WO | WO-2016161978 A1 * | 10/2016 | ............... A47L 5/22 |
| WO | 2017/003134 A1 | 1/2017 | |

OTHER PUBLICATIONS

Supplementary European Search Report dated Jan. 24, 2020 in connection with European Patent Application No. 18 76 3059, 6 pages.
Office Action dated Sep. 23, 2020 in connection with Chinese Patent Application No. 201880016594.1, 14 pages.
Office Action dated Apr. 9, 2021 in connection with Chinese Patent Application No. 201880016594.1, 14 pages.

* cited by examiner

FAN UNIT AND CLEANER HAVING THE SAME

CROSS-REFERENCE TO RELATED APPLICATION(S)

This application is based on and claims priority under 35 U.S.C. § 119 to Japanese Patent Application No. 2017-041211 filed on Mar. 6, 2017, in the Japanese Patent Office and Korean Patent Application No. 10-2017-0181908 filed on Dec. 28, 2017, in the Korean Intellectual Property Office, the disclosure of which is incorporated by reference herein in its entirety.

TECHNICAL FIELD

The present disclosure relates to a fan unit capable of effectively generating an air flow, and more particularly, to a fan unit mounted on a cleaner.

BACKGROUND

Conventionally, a direct current (DC) motor on which a brush is mounted has been generally used in a cordless stick type cleaner using battery power. Because such a DC motor has low maximum revolutions of about 20,000 rpm and a compact size, there is a problem in that performance such as suction power and the like is much lower (generally about 10 to 20 W) than a conventional canister type cleaner.

For this reason, a cordless stick type cleaner capable of implementing high suction power using a brushless DC motor has recently emerged. Such a stick type cleaner mainly employs a built-in battery as a power source to enable the motor to be driven at high rotational speed of around 70,000 to 100,000 rpm, and thus convenience is high.

In addition, as performance of a lithium ion battery is improved, a small and light-weight battery outputting high power may be supplied, and thus demand for such a type of cleaner has increased. A cordless stick type electric cleaner is disclosed, for example, in Japanese Patent Laid-Open Publication No. 2015-159841 (Patent Document 1).

SUMMARY

However, a conventional stick type electric cleaner as in the above Patent Document 1 has a problem in that suction power at a time of operation is lower than a general cleaner.

That is, while suction power of a general canister-type electric cleaner is generally about 180 W, suction power of the conventional stick-type electric cleaner is about 100 W even in a strong mode operation, and thus it may not be determined that satisfactory performance is obtained.

For this reason, a stick type electric cleaner is treated as an auxiliary cleaner, and the canister type electric cleaner is still employed as a main cleaner in many cases. As a result, although there are many users who own the two types of cleaners described above, it is preferable for only the stick type electric cleaner to be sufficient as the owned cleaner.

To this end, although it is necessary to implement high suction power, for example, 100 W or more, in the stick type electric cleaner, an increase in size of a motor or a fan in a conventional configuration, as in the above Patent Document 1, is inevitable, and thus there is a problem in that a weight or size of the cleaner is increased which makes it difficult to handle the cleaner.

Therefore, it is an aspect of the present disclosure to provide a fan unit in which a structure of a fan and a driving source thereof is improved to realize stable and high-efficient fan driving, thereby obtaining a high suction force in a stick type electric cleaner.

In accordance with one aspect of the present disclosure, a cleaner comprising a fan unit, wherein the fan unit comprises: a first fan and a second fan disposed in a line on the same rotation axis; and a driving motor configured to drive the first fan and the second fan, wherein the second fan is configured to be rotated in a direction opposite a direction in which the first fan is rotated.

At least one of the first fan and the second fan may be an axial flow fan.

At least one of the first fan and the second fan may be a mixed flow fan or a centrifugal fan.

An outer diameter of the first fan may be smaller than that of the second fan.

The driving motor may comprise a stator and a plurality of rotors which are rotated relative to the stator.

The plurality of rotors may comprise; an inner rotor located at an inner side of the stator in a radial direction; and an outer rotor located at an outer side of the stator in the radial direction.

The inner rotor may be connected to the first fan and the outer rotor is connected to the second fan.

A first air gap may be formed between the stator and the inner rotor, a second air gap may be formed between the stator and the outer rotor, and a size of any one of the first air gap and the second air gap may vary in a circumferential direction of the stator.

The driving motor may be a single-phase brushless direct current (DC) motor.

The cleaner may further comprise: a sensor configured to detect a rotational position of any one of the inner rotor and the outer rotor; and a processor configured to control rotation of the inner rotor and the outer rotor on the basis of position information detected by the sensor.

When the driving motor is initially driven, the processor may control an induced current to be supplied to the stator so that the inner rotor and the outer rotor are disposed at predetermined initiating positions.

Electrical angles of both of the inner rotor and the outer rotor may range between 0° and 180° in a state in which the inner rotor and the outer rotor are disposed at the initiating positions.

The processor may control a current to be supplied to the stator before the inner rotor and the outer rotor are disposed at the initiating positions.

The first fan may comprise a plurality of first blades, the second fan is spaced apart from the first fan and comprises a plurality of second blades, and a direction in which the first blade is inclined with respect to a driving shaft of the driving motor differs from a direction in which the second blade is inclined with respect to the driving shaft of the driving motor.

The cleaner may further comprise a running section in which a suction port is provided; and a manipulation section connected to the running section, wherein the fan unit is disposed in the manipulation section to generate a suction force for suctioning dust through the suction port, the fan unit further comprises a case having an inlet into which air is introduced and an exhaust port through which the air introduced through the inlet is discharged, and the first fan is disposed closer to the inlet than the second fan.

The driving motor may comprise: a stator; a first rotor disposed to face an inner circumferential surface of the stator; and a second rotor disposed to face an outer circumferential surface of the stator, wherein the first rotor is connected to the first fan by the driving shaft.

The second rotor may comprise a cylindrical outer core and a plurality of magnets coupled to an inner circumferential surface of the outer core; and the second fan is coupled to one end portion of the outer core.

The plurality of first blades may comprise: a plurality of main blades each having a plate shape; and a plurality of sub blades each having a length smaller than that of the main blade, wherein the plurality of main blades and the plurality of sub blades are spaced apart from each other and alternately disposed in a circumferential direction of the first fan.

The plurality of second blades may be disposed to be inclined in a direction which differs from a direction in which the plurality of first blades are inclined.

A length of the first fan may be greater than that of the second fan in a direction in which the driving shaft of the driving motor extends.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings. However, the following description is merely example and is not intended to limit the present disclosure, its application, or its use. Meanwhile, in the following description, the term "front side" represents a suction port side of a cleaner, and the term "rear side" represents a handle side of the cleaner.

Figure 1:
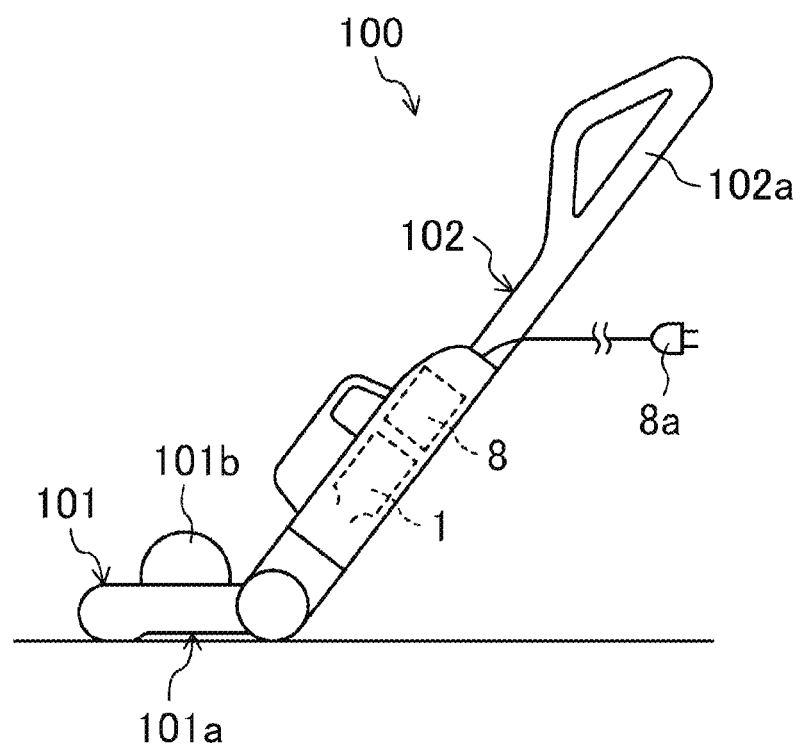
FIG. 1 is a schematic view illustrating a stick-type vacuum cleaner according to an embodiment of the present disclosure.

FIG. 1 shows a cleaner 100 to which a fan unit according to the present disclosure is applied. The cleaner 100 is a handy stick-type cleaner (also simply referred to as a "cleaner 100"), and includes a running section 101 and a manipulation section 102.

The running section 101 is a part running on a floor or the like, and a suction port 101a for suctioning dust is formed on a lower surface of the running section 101. A dust box 101b configured to receive the suctioned dust is detachably provided on an upper portion of the running section 101.

The manipulation section 102 is a stick-shaped part that is bendably connected to a rear portion of the running section 101, and a handle 102a is provided at a rear end portion of the manipulation section. A fan unit 1, a battery 8, or the like is accommodated in a lower portion of the manipulation section 102. The battery 8 is configured to be rechargeable through a power cord having a plug 8*a* attached to a front end thereof (the electric cord is accommodated in the manipulation section 102 when the cleaner is not in use). The fan unit 1 is operated by a supply of power from the battery 8, and forms an air flow to generate a suction force for suctioning dust from the suction port 101*a*.

The fan unit 1 has a compact (small-sized) shape that may be accommodated in the stick-shaped manipulation section 102, and a structure of the fan unit is designed to allow a powerful suction force (blowing force) to be efficiently obtained.

Figure 2:
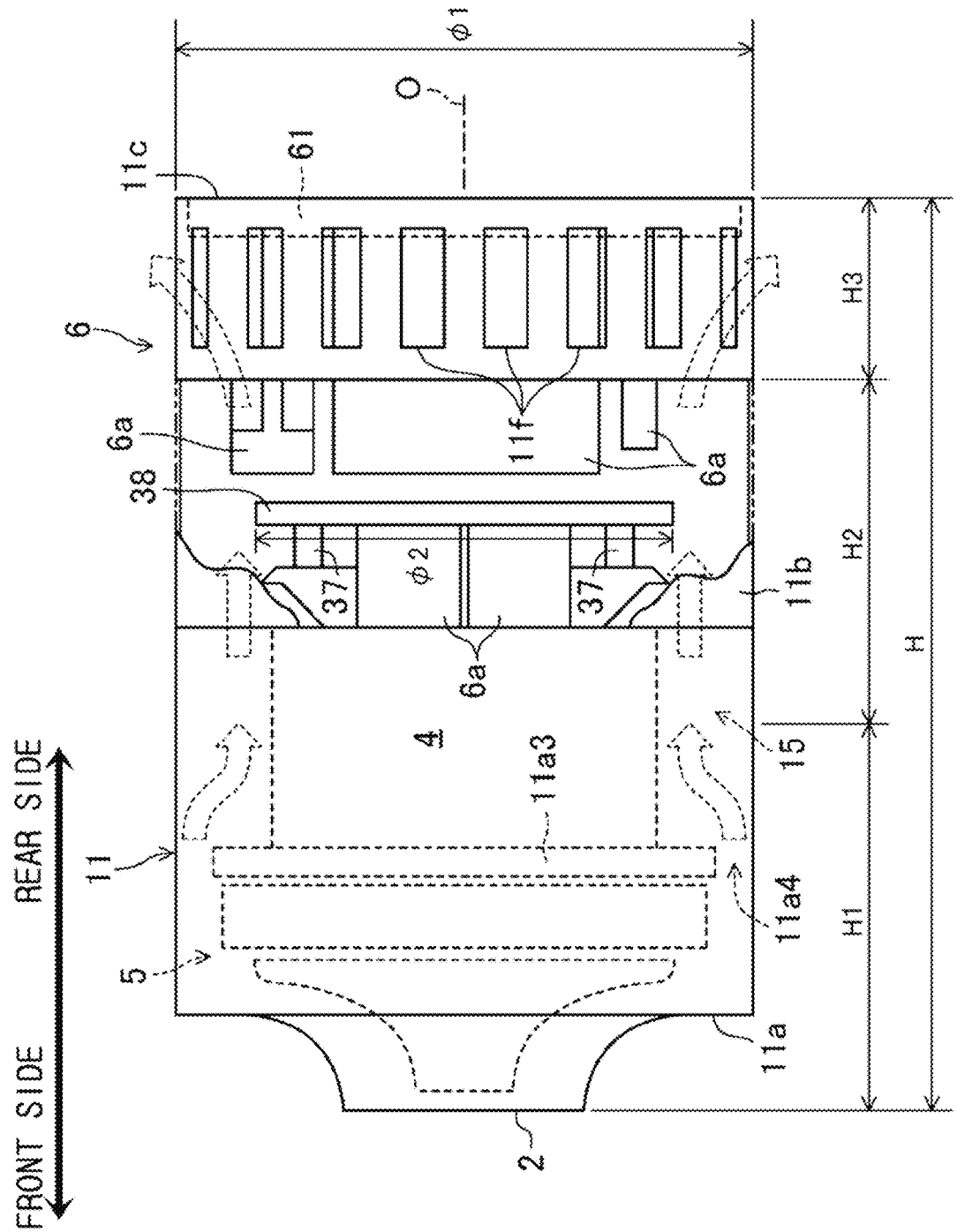
FIG. 2 is a schematic view illustrating a fan unit.

As shown in FIG. 2, the fan unit 1 includes a motor case 11 having one suction port 2 formed at a front end and a plurality of exhaust ports 11*f* formed in a rear end. A blowing path 15 for suctioning air from the suction port 2 and discharging air from the exhaust port 11*f* is formed in the motor case 11. In the blowing path 15, a fan mechanism 5, a direct current (DC) motor 4, and an electrical component accommodation part 6 are sequentially arranged in a row along a rotation axis O of the DC motor 4 from the front of the blowing path.

The motor case 11 includes a front case 11*a* covering the fan mechanism 5 and the DC motor 4, an intermediate case 11*b* connected to a rear side of the front case 11*a*, and a rear case 11*c* connected to a rear side of the intermediate case 11*b*.

The front case 11*a* is formed of or covered with, for example, an insulating material so that an insulation distance between the front case 11*a* and the DC motor 4 may be maintained to secure safety. The intermediate case 11*b* is made of, for example, aluminum, and is configured to cover a front side of the electrical component accommodation part 6. A rear side of the electrical component accommodation part 6 is covered with the rear case 11*c*. The plurality of exhaust ports 11*f* are formed at regular intervals in a circumferential direction in the rear case 11*c*.

The fan mechanism 5, the DC motor 4, and the electrical component accommodation part 6 all have the same outer diameter Φ1 (for example, Φ1=70 mm) and are integrally formed by being covered with the motor case 11 having a length H (for example, H=110 mm).

Figure 3:
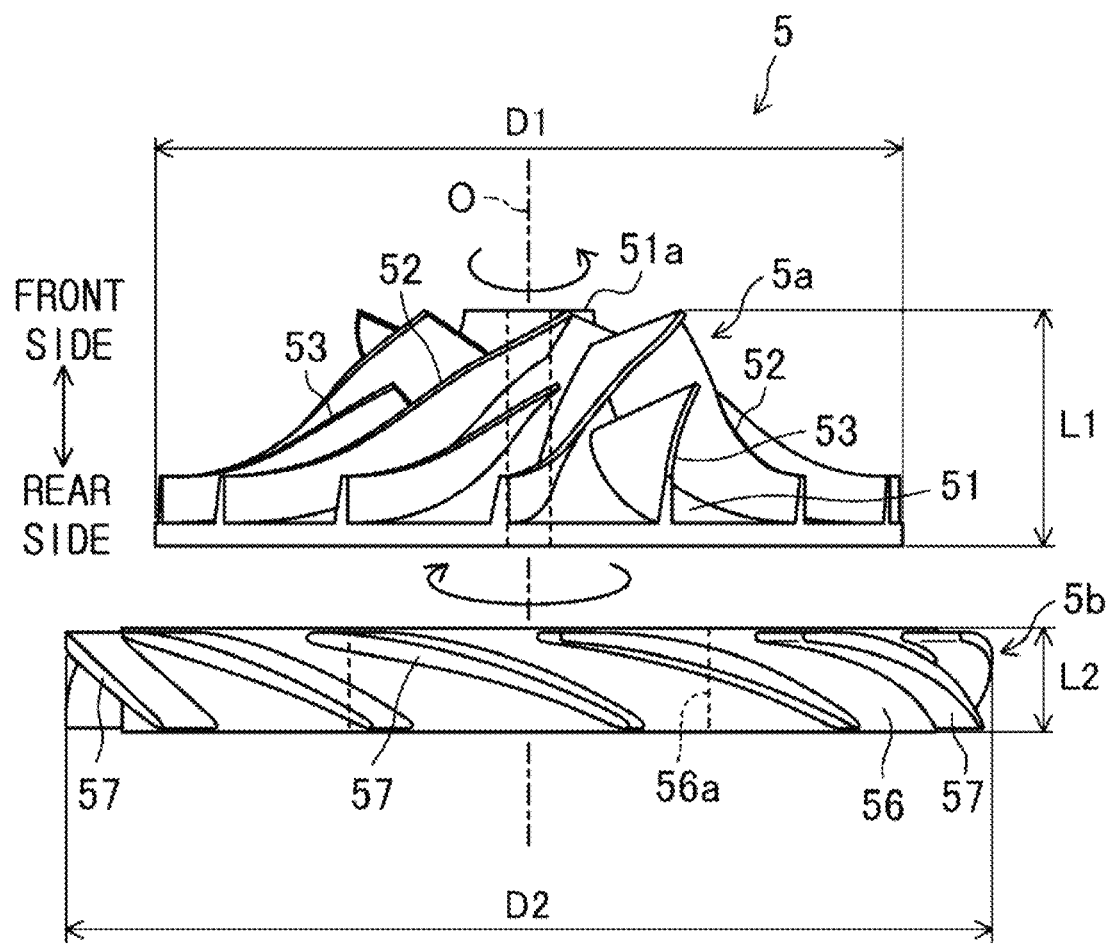
FIG. 3 illustrates a side view of the fan mechanism.
Figure 4:
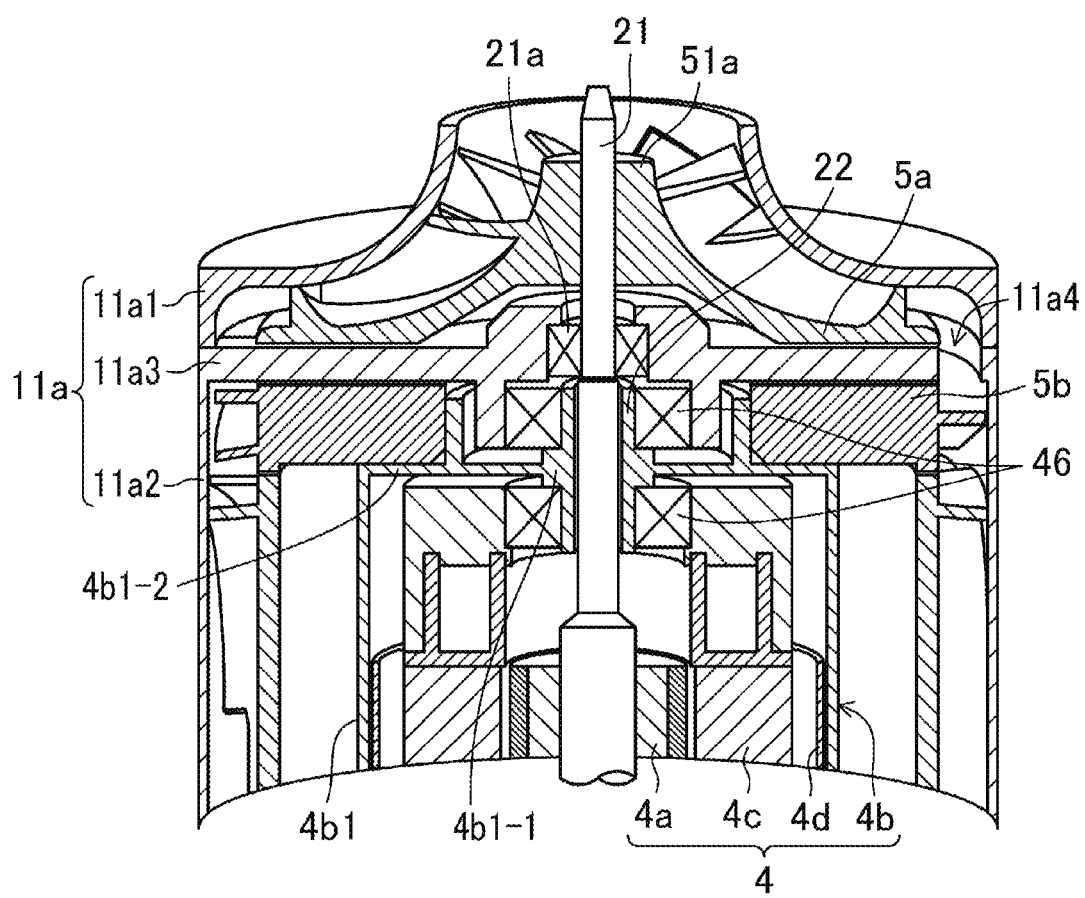
FIG. 4 is a schematic view illustrating an inside of a front case housing the fan mechanism and a DC motor.

The fan mechanism 5 is shown in FIGS. 3 and 4. The fan mechanism 5 includes a first fan 5*a* and a second fan 5*b* disposed in series in a front-rear direction about the rotation axis O. Specifically, the first fan 5*a* is located farther at an upstream side of the blowing path 15 than the second fan 5*b*, and the second fan 5*b* is disposed at a rear side of the first fan 5*a*.

In the fan mechanism 5, a powerful suction force is obtained by using a combination of two fans having different shapes to increase a static pressure.

The first fan 5*a* is a centrifugal fan having an exterior of a truncated cone shape. The first fan 5*a* includes a base part 51, a plurality of main blades 52, and a plurality of sub blades 53. The base part 51 has a boss portion 51*a* formed at a center thereof, and an axial hole is formed in the boss portion. A surface (front surface) of the base part 51 is provided as an inclined surface inclined outwardly downward in a radial direction from the boss portion 51*a* toward an outer edge portion. The plurality of main blades 52 and the plurality of sub blades 53 are alternately formed on the surface of the base part 51 in parallel in a circumferential direction.

Each of the main blades 52 has a rectangular plate shape, and the plurality of main blades are formed in a standing state on the surface of the base part 51 at predetermined intervals in the circumferential direction. Each of the main blades 52 is disposed to extend from the boss portion 51*a* at the center of the base part 51 toward the outer edge portion and to be obliquely inclined in the same direction as a rotational direction of the first fan 5*a*. In addition, each of the main blades 52 is bent to be gradually curved from the boss portion at the center of the base part 51 toward the outer edge portion, and the main blade is provided in a state in which a side corresponding to the center of the base part is further inclined with respect to the surface of the base part 51 than a side corresponding to the outer edge portion of the base part (lying state).

Each of the sub blades 53 has a triangular plate shape and is formed in a standing state between two adjacent main blades 52 on the surface of the base part 51. Each of the sub blades 53 is formed to have a length smaller than that of the main blade 52, and each of the sub blades extends from the outer edge portion toward the center portion of the base part 51 and is inclined in the same shape as the main blade 52.

The second fan 5*b* is an axial flow fan having an annular exterior. The second fan 5*b* includes a base part 56 and a plurality of axial flow blades 57. The base part 56 has an annular shape with a thickness, and an axial hole 56*a* having a large diameter is formed at a center of the base part. Each of the axial flow blades 57 has a rectangular plate shape, and the plurality of axial flow blades are formed in a standing state on an outer circumferential surface of the base part 56 at predetermined intervals in a circumferential direction.

Each of the axial flow blades 57 is arranged to extend from an edge of a front side of the outer circumferential surface of the base part 56 toward an edge of a rear side and to be obliquely inclined in a direction which differs from the rotational direction of the first fan 5*a* (a direction opposite the main blade 52 and the sub blade 53 of the first fan 5*a*). In addition, each of the axial flow blades 57 is gently curved to allow a central portion thereof to protrude toward the front side.

That is, an inclination direction of each of the main blades 52 and each of the sub blades 53 of the first fan 5*a* with respect to the rotational center is opposite an inclination direction of the axial flow blade 57 of the second fan 5*b* with respect to the rotational center (contra-rotating fan).

Regarding sizes of the first fan 5*a* and the second fan 5*b*, a length of the first fan 5*a* in a direction in which the rotation axis O extends (the front-rear direction) is greater than that of the second fan 5*b* (L1>L2), and an outer diameter of the second fan 5*b* is greater than that of the first fan 5*a* (D2>D1).

By forming the first fan 5*a* and the second fan 5*b* to have the above sizes, it is possible to smoothly guide the air flow generated by the first fan 5*a* to the second fan 5*b* and to improve suction performance (blowing performance).

As shown in FIG. 4, the first fan 5*a* and the second fan 5*b* are accommodated in a front portion of the front case 11*a*. The front case 11*a* includes a first member 11*a*1 configured to accommodate the first fan 5*a* and a second member 11*a*2 configured to accommodate the second fan 5*b* and the DC motor 4. The first member 11*a*1 is formed in a truncated cone shape corresponding to the first fan 5*a*, and the second member 11*a*2 is formed in a cylindrical shape.

A supporting wall portion 11*a*3 disposed between the first fan 5*a* and the second fan 5*b* is formed at a front end portion of the second member 11*a*2 to which the first member 11*a*1 is connected. An opening is formed at a center of the supporting wall portion 11*a*3, and a rod-shaped shaft 21 is inserted into and passed through the opening. The shaft 21 is supported and may be freely rotated about the rotation axis O through an inner bearing 21a fitted in the opening.

By inserting a front end portion of the shaft 21 protruding forward from the supporting wall portion 11a3 into the axial hole of the boss portion 51a, the first fan 5a is fixed to the shaft 21. An opening 11a4 included in the blowing path 15 is formed on an outer circumference portion of the supporting wall portion 11a3.

The first fan 5a and the second fan 5b are configured to be rotated in opposite directions at a rotation ratio of 1:1 and to suppress energy loss caused by an air flow to obtain a high suction force.

That is, air suctioned from the suction port 2 by rotation of the first fan 5a is guided to the outside in a radial direction of the first fan while being turned, and is then guided to the second fan 5b through the opening 11a4. An opposite turning force generated by rotation of the second fan 5b is applied to the air flow guided to the second fan 5b so that the air flow is commutated again such that a turning component of the air flow is canceled out. Accordingly, only a straight-ahead component of the air flow remains and a liner air flow is formed. As a result, energy loss caused by turning may be reduced to increase a static pressure.

The first fan 5a and the second fan 5b are rotated by the DC motor 4.

Increasing a motor output is indispensable in generation of a powerful suction force by rotating the first fan 5a and the second fan 5b. As a result, consumption of the battery 8 is increased and a time for which the battery 8 may be operated on one charge is reduced, and thus there may be concern that usability is decreased.

Figure 5:
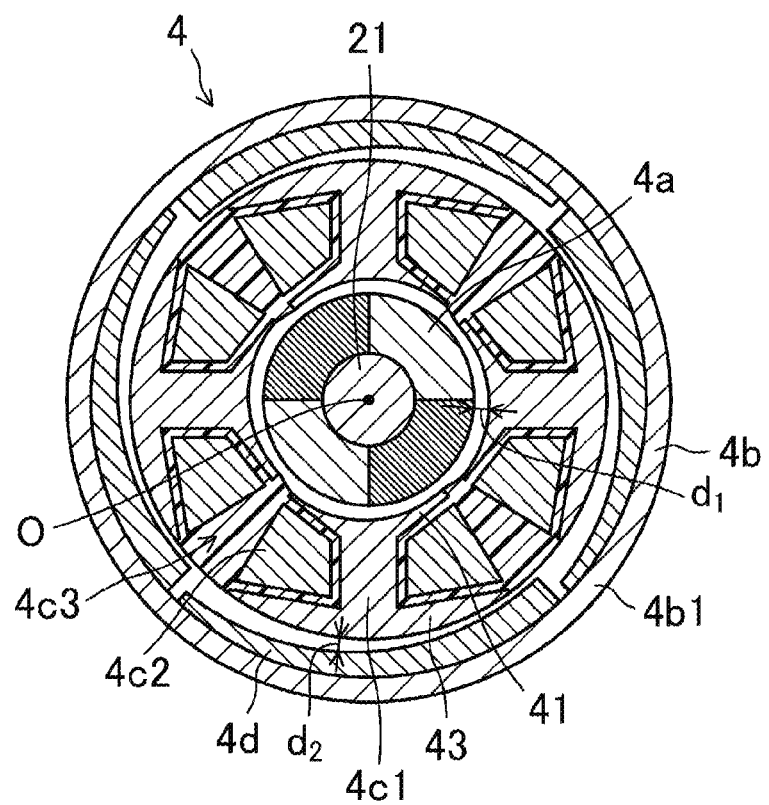
FIG. 5 illustrates a cross-sectional view of the DC motor.

Therefore, in the fan unit 1 of the present disclosure, the DC motor 4 is configured to achieve high efficiency with a compact size. In other words, as shown in FIG. 4 or 5, the DC motor 4 is a brushless motor and includes one stator 4c and two rotors (dual rotors). Specifically, the DC motor 4 is provided with an inner rotor 4a, an outer rotor 4b, and the stator 4c.

The DC motor may be designed such that when the DC motor is driven by, for example, three-phase power, the inner rotor 4a and the outer rotor 4b are rotated in opposite directions at different rotation ratios, such as 1:2, 2:1, or the like. In the present embodiment, however, in order to implement a simple configuration, a single-phase driving is applied and the DC motor is designed such that the inner rotor 4a and the outer rotor 4b are smoothly and efficiently rotated in opposite directions (contra rotation) at a fixed rotation ratio of 1:1.

The inner rotor 4a is formed of a magnetized magnetic material having a cylinder shape with a small diameter. As shown in FIG. 5, the inner rotor 4a is magnetized to allow two N poles and two S poles to be alternately disposed in a circumferential direction. That is, the number of poles of the inner rotor 4a is four. When viewed in an axial direction, a cross section of an outer circumferential surface of the inner rotor 4a is a complete circle, and a distance between the rotation axis O and the outer circumferential surface thereof is constant.

A through hole is formed at a center of the inner rotor 4a. A base end portion of the shaft 21 is fixedly inserted into the through hole. Accordingly, the inner rotor 4a is integrally connected to the first fan 5a by the shaft 21.

The stator 4c is formed in a cylindrical shape with a thick axial cross section around the rotation axis O and is fixed to the motor case 11. The stator 4c includes four element cores 4c1, four coils 4c2, and the like.

Each of the element cores 4c1 includes an arc-shaped inner teeth portion 41 facing the inner rotor 4a and extending in a circumferential direction, an arc-shaped outer teeth portion 43 facing the outer rotor 4b and extending in a circumferential direction, and a connection portion extending in a radial direction of the stator 4c to connect the inner teeth portion 41 and the outer teeth portion 43. The inner teeth portion 41 is disposed at an inner side of the outer teeth portion 43 with respect to the radial direction of the stator 4c.

Four slots 4c3 (spaces for accommodating wires) are formed between adjacent element cores 4c1. Each of the coils 4c2 is formed by a wire which is wound around the connection portion through the slot 4c3. Each of the element cores 4c1 and each of the coils 4c2 are embedded in a resin so that the element core and coil are integrally formed in a cylindrical shape (mold formation). An entire inner facing surface of the inner teeth portion 41 facing the inner rotor 4a and an outer facing surface of the outer teeth portion 43 facing the outer rotor 4b are exposed from the resin.

When viewed in an axial direction of an outer circumferential surface of the stator 4c, a cross section of the outer facing surface of each of the outer teeth portions is a complete circle, and a distance between the rotation axis O and the outer facing surface is constant. In contrast, a distance between the rotation axis O and the inner facing surface (having an arc-shaped cross section) of each of the inner teeth portions is not constant, and each of the inner teeth portions is configured to allow the distance between the rotation axis O and the inner facing surface to be gradually decreased from one end side toward the other end side in a circumferential direction.

Accordingly, a gap d1 (inner air gap) between the inner facing surface of each of the inner teeth portions 41 and the outer circumferential surface of the inner rotor 4a is configured to be gradually increased from one end portion thereof toward the other end portion so that the inner air gap is smallest at the one end portion in the circumferential direction (front end portion in a counterclockwise direction in FIG. 5) and is largest at the other end portion. Each of the inner gaps d1 is arranged to be rotationally symmetrical with respect to the rotation axis O.

As a result, the inner rotor 4a is more liable to receive to a magnetic force at the one end portion side in the circumferential direction at which the inner air gap d1 is small, and thus rotation is induced at the one end portion side, that is, in a counterclockwise direction in FIG. 5.

The outer rotor 4b includes a cylindrical outer core 4b1 having a large diameter and four outer magnets 4d. A cross section of an inner circumferential surface of the outer core 4b1 in an axial direction thereof is a complete circle, and a distance between the rotation axis O and the inner circumferential surface thereof is constant. A boss portion 4b1-1 located at a center of the outer core 4b1 and a fan attachment portion 4b1-2 disposed at an outer side of the boss portion in a radial direction are formed on an upper portion of the outer core 4b1. A through hole having a diameter which is slightly greater than the shaft 21 is formed on the boss portion 4b1-1, and the shaft 21 is inserted into the boss portion through the through hole.

The second fan 5b is attached to the fan attachment portion 4b1-2. Accordingly, the outer rotor 4b is integrally connected to the second fan 5b through the outer core 4b1. The boss portion 4b1-1 is supported by the supporting wall portion 11a3 and the stator 4c via a pair of bearings 46 so that the outer rotor 4b is freely rotatable about the rotation axis O.

The pair of bearings 46 are arranged at a location overlapping at least a portion of the second fan 5b when viewed in a direction perpendicular to the rotation axis O. Thus, it is possible to stabilize rotation of the second fan 5b while improving layout flexibility.

The outer magnets 4d are arranged on the inner circumferential surface of the outer core 4b1 at regular intervals in a circumferential direction. In each of the outer magnets 4d, two N poles and two S poles are alternately arranged in the circumferential direction, and the same poles face each other. That is, the number of poles of the outer rotor 4b is four.

Each of the outer magnets 4d is formed such that a thickness thereof (size in a radial direction) is gradually reduced from one end side towards the other end side in the circumferential direction.

Accordingly, a gap d2 (outer air gap) between an inner circumferential surface of each of the outer magnets 4d and the outer circumferential surface of the stator 4c is configured to be gradually increased from one end portion thereof toward the other end portion so that the outer air gap is smallest at the one end portion in the circumferential direction (front end portion in a counterclockwise direction in FIG. 5) and is largest at the other end portion. The outer air gap d2 is disposed to be rotationally symmetrical with respect to the rotation axis O.

As a result, the outer rotor 4b is more liable to receive a magnetic force at the one end portion side in the circumferential direction at which the outer air gap d2 is small, and rotation of the outer rotor is induced in a direction opposite the direction in which the inner rotor 4a is rotated, that is, in a clockwise direction in FIG. 5. Since the inner rotor 4a and the outer rotor 4b which are being rotated are disposed on the inside and outside of the stator 4c which is not rotated, a rotational direction of the inner rotor 4a is opposite a rotational direction of the outer rotor 4b.

Since rotation of the inner rotor 4a and rotation of the outer rotor 4b are induced in opposite directions, as described above, contra rotation may be smoothly induced and efficiency is improved.

Further, productivity of the DC motor 4 is also improved. That is, in order to make the inner and outer air gaps d1 and d2 nonuniform, shapes of the inner teeth portion 41 and the outer teeth portion 43 of the element core 4c1 are not adjusted at the inside and the outside, respectively, but a shape of the outer magnet 4d is adjusted. Accordingly, the inner and outer air gaps d1 and d2 may be configured with high precision by a relatively simple operation.

The DC motor 4 includes two rotors having a magnetic force. Due to the above, in a non-excited state, a torque (magnetic gear torque) generated by magnetic forces of the inner rotor and the outer rotor in addition to a cogging torque caused by the stator 4c acts on each of the inner rotor 4a and the outer rotor 4b. When the DC motor is rotationally driven, an excitation torque generated by excitation of the coil 4c2 also acts on the inner rotor 4a and the outer rotor 4b.

Figure 6:
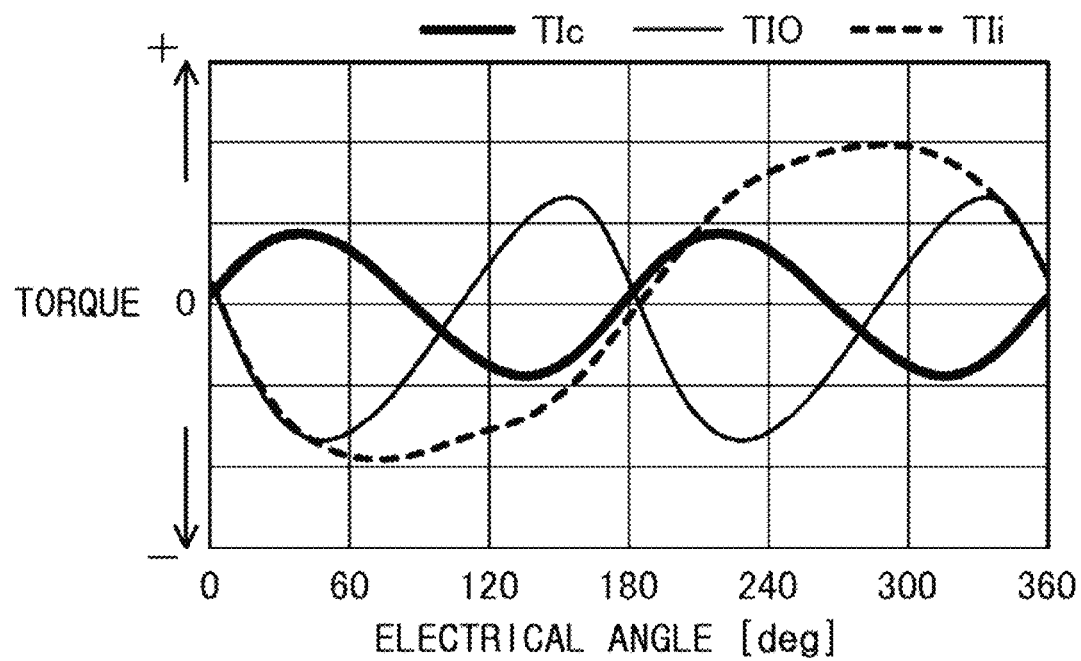
FIG. 6 is a view illustrating a torque (a component of force) acting on an inner rotor.
Figure 7:
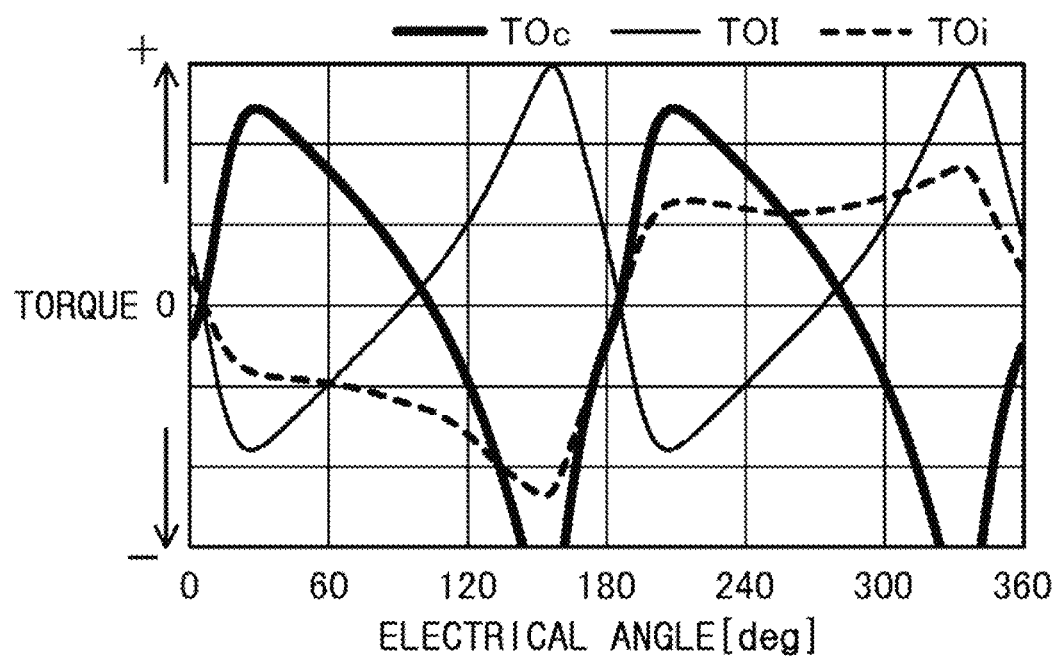
FIG. 7 is a view illustrating a torque (a component of force) acting on an outer rotor.

FIGS. 6 and 7 show components of force of a torque acting on the inner rotor 4a and the outer rotor 4b when the DC motor is rotationally driven. FIG. 6 shows the component of force acting on the inner rotor 4a, and FIG. 7 shows the component of force acting on the outer rotor 4b.

An excitation torque TIi generated due to excitation of the coil 4c2, a cogging torque TIc structurally generated between the inner rotor and the magnetic stator 4c, and a magnetic gear torque TIO structurally generated between the inner rotor and the outer rotor 4b act on the inner rotor 4a.

Therefore, a torque $TI(\theta I)$ acting on the inner rotor 4a when the DC motor is rotationally driven is expressed as follows.

$$TI(\theta I)=TIi(\theta I)+TIc(\theta I)+TIO(\theta O)$$

Here, $\theta I$ is an electrical angle of the inner rotor 4a, and $\theta O$ is an electrical angle of the outer rotor 4b.

Similarly, an excitation torque TOi generated due to excitation of the coil 4c2, a cogging torque TOc structurally generated between the outer rotor and the magnetic stator 4c, and a magnetic gear torque TOI structurally generated between the outer rotor and the inner rotor 4a act on the outer rotor 4b.

Therefore, a torque $TO(\theta O)$ acting on the outer rotor 4b when the DC motor is rotationally driven is expressed as follows.

$$TO(\theta O)=TOi(\theta O)+TOc(\theta O)+TOI(\theta I)$$

Therefore, the inner rotor 4a and the outer rotor 4b are rotated by action of the torque $TI(\theta I)$ and the torque $TO(\theta O)$, respectively, when power is supplied.

In addition, the inner rotor 4a and the outer rotor 4b are stopped by action of the cogging torque and the magnetic gear torque when power is not supplied. In the DC motor 4 according to the present embodiment, however, there are two positions as the stop position.

Figure 8:
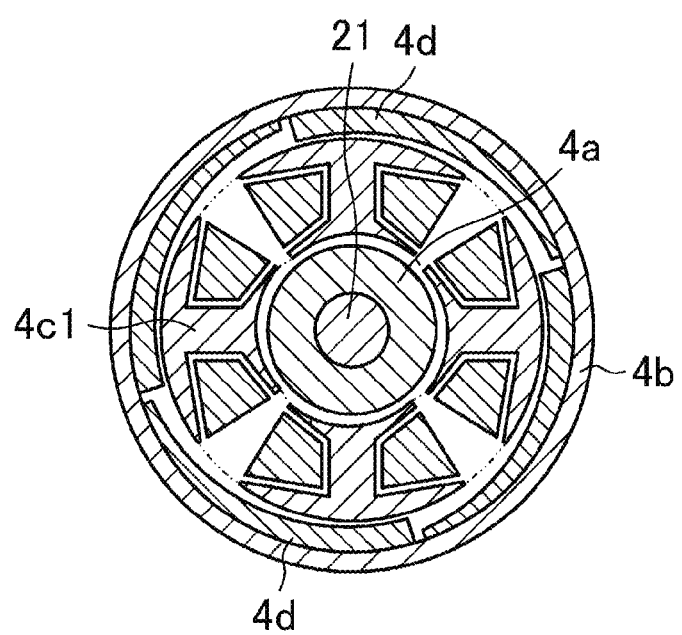
FIG. 8 is a view illustrating a first state when power is not supplied.
Figure 9:
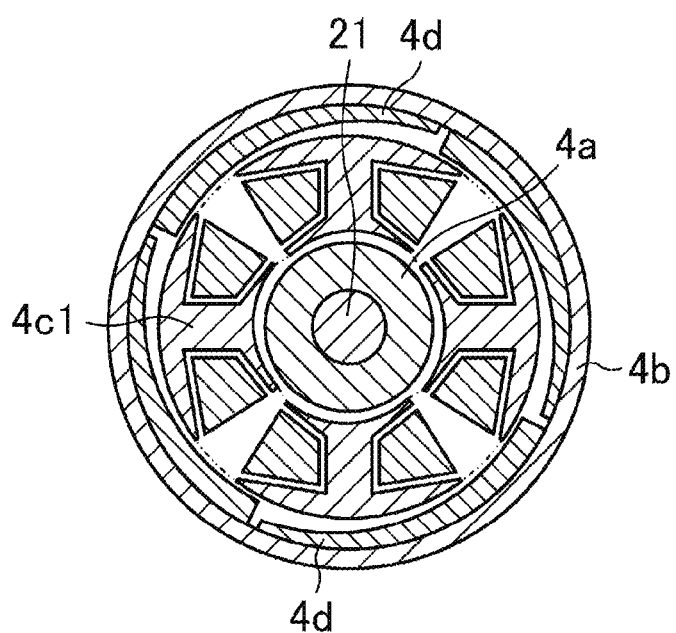
FIG. 9 is a view illustrating a second state when power is not supplied.

Specifically, the inner rotor 4a and the outer rotor 4b are balanced and stopped at two positions which are a position shown in FIG. 8 (first natural stop position) and a position shown in FIG. 9 (second natural stop position). Specifically, the inner rotor and the outer rotor are stopped at the positions of electrical angles $\theta Ia$ and $\theta Oa$ at which $TI(\theta Ia)(=TIc(\theta Ia)+TIO(\theta Oa))$ becomes 0 and $TO(\theta Oa)(=TOc(\theta Oa)+TOI(\theta Ia))$ becomes 0, respectively.

Figure 10:
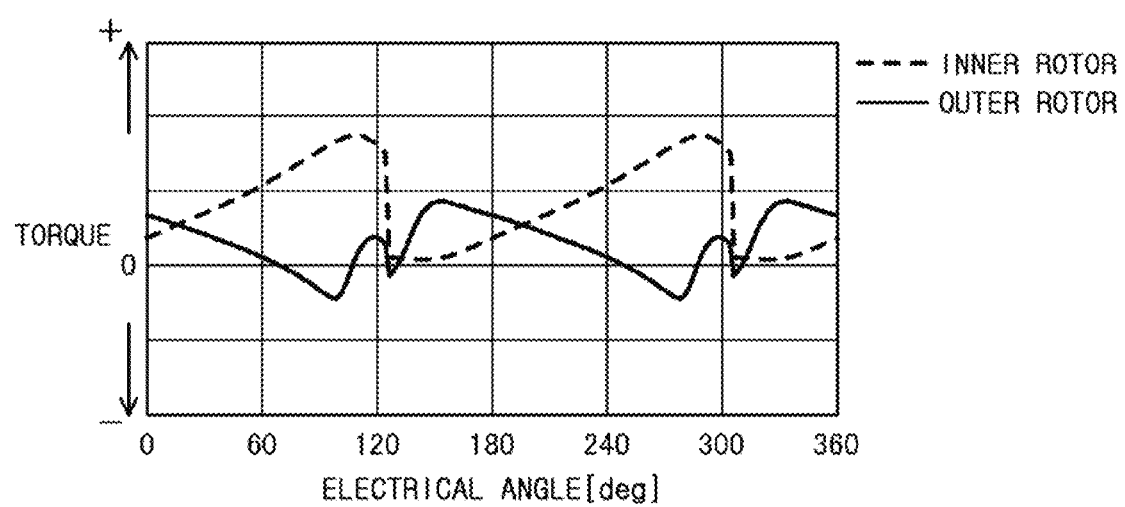
FIG. 10 is a view illustrating changes of torque acting on the respective rotors when starting from the first state.

FIG. 10 shows changes in the torque $TI(\theta I)$ and the torque $TO(\theta O)$ when the DC motor 4 is started from the first natural stop position. In the drawing, a torque rotating the rotors in a proper direction is represented by a positive value (+) (this is also applied to the following drawings). As shown in FIG. 10, when the DC motor 4 is started from the first natural stop position, all of torques acting on the inner rotor 4a and the outer rotor 4b have a positive (+) value. That is, in this case, the torques act in directions in which contra rotation is generated.

Figure 11:
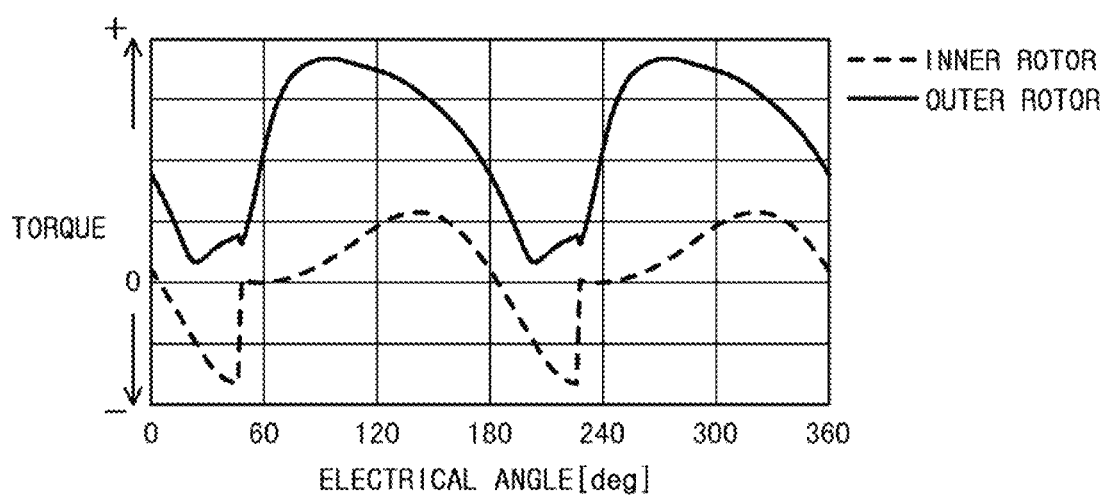
FIG. 11 is a view illustrating changes of torque acting on the respective rotors when starting from the second state.

FIG. 11 shows changes in the torque $TI(\theta I)$ and the torque $TO(\theta O)$ when the DC motor 4 is started from the second natural stop position.

As shown in FIG. 11, when the DC motor 4 is started from the second stop position, the torque acting on the inner rotor 4a has a negative (−) value. That is, in this case, the torque that is rotated in the same direction as the outer rotor 4b acts on the inner rotor 4a.

That is, the inner rotor 4a and the outer rotor 4b may be rotated in opposite directions or rotated in the same direction due to a position at which the inner rotor 4a and the outer rotor 4b are stopped prior to initiating start-up.

When the motor is a conventional single-phase motor having one rotor, since the stop point is one position, it is possible to stably start the motor, and it is possible to rotate the rotor in a certain direction by making at least any one of the air gaps be nonuniform.

In addition, when one rotor is employed, by applying a positive current when the rotor is located at an electrical angle of 0° to 180° and by applying a negative current when the rotor is located at an electrical angle of 180° to 360°, it is possible to continuously rotate the rotor.

However, when two rotors are employed, it is not possible to rotate both of the rotors in a certain direction unless both of the rotors are arranged in any one of electrical angle ranges of 0° to 180° and 180° to 360°.

Accordingly, the DC motor 4 of the present disclosure is configured such that, by supplying a certain induced current when start-up is initiated, the inner rotor 4a and the outer rotor 4b are guided to a predetermined start-up initiating position and rotation is started from the start-up initiating position.

Figure 12:
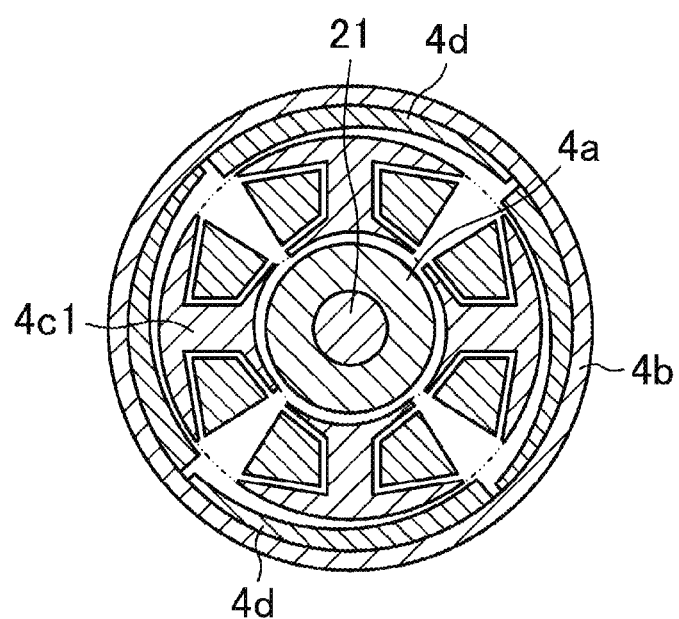
FIG. 12 is a view illustrating the state of the start initiating position.
Figure 13:
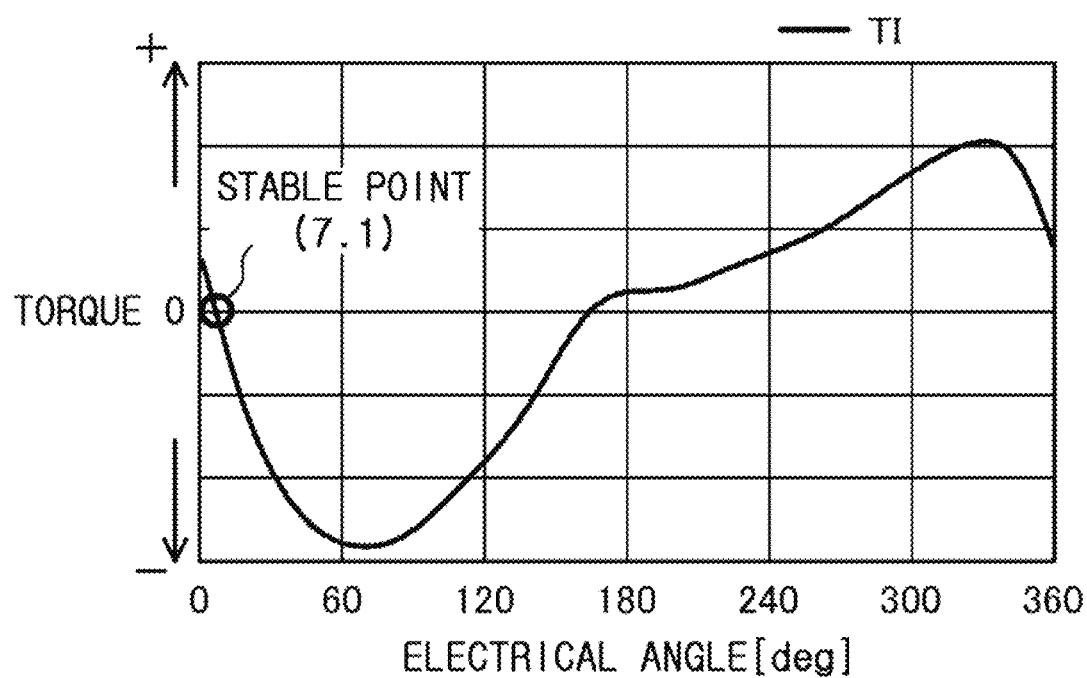
FIG. 13 is a view illustrating the start initiating position (stable point) of the inner rotor.
Figure 14:
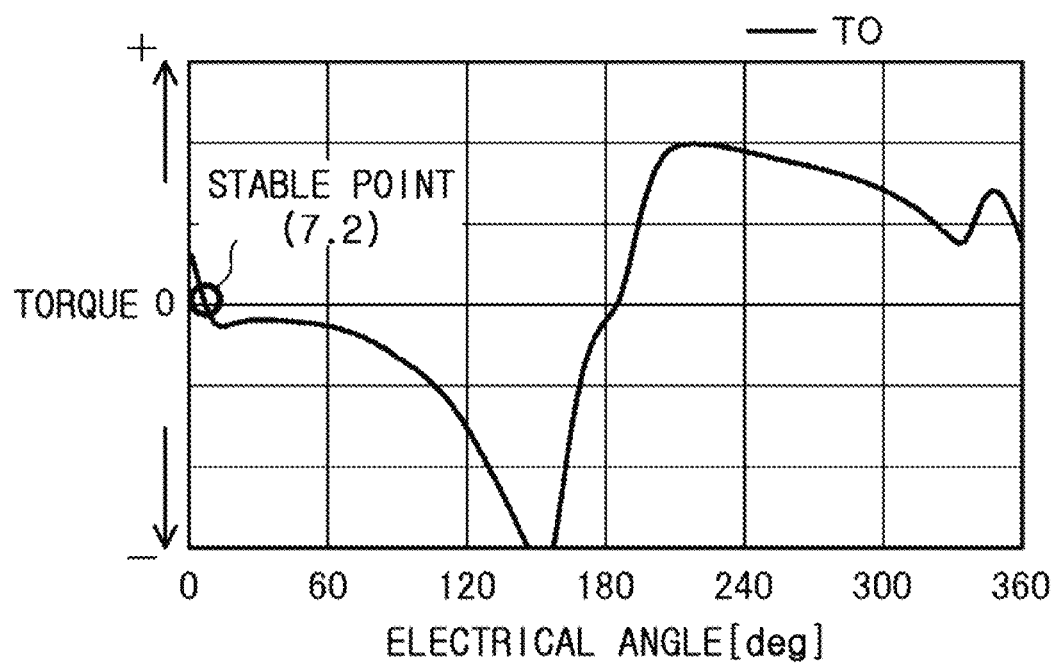
FIG. 14 is a view illustrating the start initiating position (stable point) of the outer rotor.

Specifically, a current of −30 A is applied as an induced current to guide the inner rotor 4a and the outer rotor 4b to a predetermined start initiating position, as shown in FIG. 12. That is, as shown in FIG. 13, the inner rotor 4a is guided to a predetermined start initiating position ($\theta Ib = 7.1°$) at which the torque is zero. In addition, as shown in FIG. 14, the outer rotor 4b is also guided to a predetermined start initiating position ($\theta Ob = 7.2°$) at which the torque is zero.

A balance of the torques acting on the inner rotor 4a and the outer rotor 4b at the above start initiating positions may be expressed as follows.

$$TI(\theta Ib) = TIi(\theta Ib) + TIc(\theta Ib) + TIO(\theta Ob) = 0$$

$$TO(\theta Ob) = TOi(\theta Ib) + TOc(\theta Ob) + TOI(\theta Ib) = 0$$

In addition, in order to make both the inner rotor 4a and the outer rotor 4b be rotated in a certain direction, the above start initiating positions are set to additionally satisfy conditions of $0 \leq \theta Ib < 180$ and $0 \leq \theta Ob < 180$ or $180 \leq \theta Ib < 360$ and $180 \leq \theta Ob < 360$. By setting the above start initiating positions as above, it is possible to arrange all of the inner rotor 4a and the outer rotor 4b in any one of the electrical angle ranges of 0° to 180° and 180° to 360° and rotate the inner rotor 4a and the outer rotor 4b in a certain direction.

Figure 15:
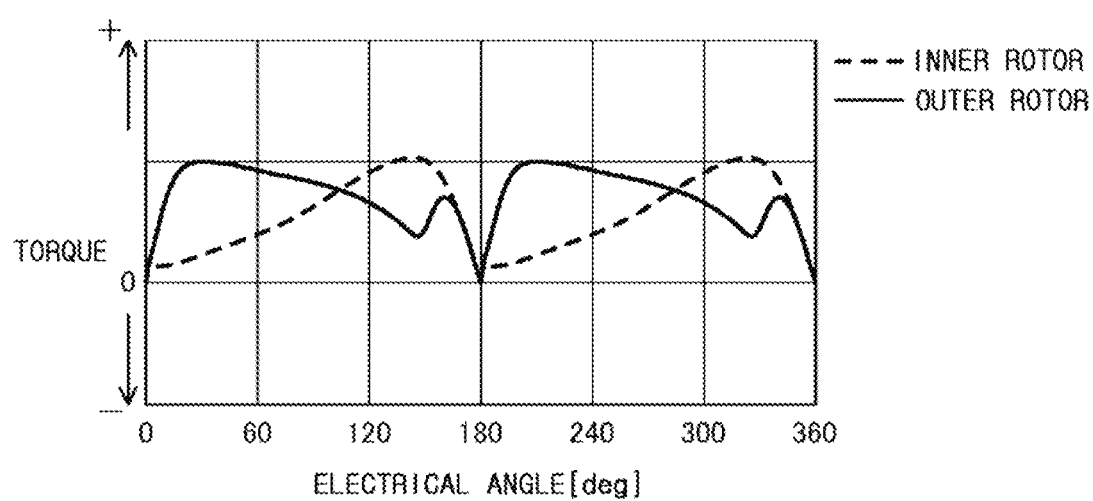
FIG. 15 is a view illustrating changes of torque acting on each rotor when starting from the start initiating position.

FIG. 15 shows the torques acting on the inner rotor 4a and the outer rotor 4b when the motor is started from the start-up initiating position, which is set as described above.

As shown in FIG. 2, electrical components 6a, such as various kinds of capacitors, switching elements, or the like, are accommodated in the electrical component accommodation part 6. A driving circuit (driving processor) for driving the DC motor 4 is constituted by the electrical components 6a. An H-bridge circuit is employed in the driving circuit because of the single-phase driving. Generally, when two rotors are driven, two inverters are used in the driving circuit. However, one inverter is disposed in the driving circuit in the DC motor 4 of the present disclosure.

The driving circuit is provided with a position sensor (not shown) for detecting a rotational position of at least one of the inner rotor 4a and the outer rotor 4b. Rotation of each of the inner rotor 4a and the outer rotor 4b is controlled on the basis of position information detected by the position sensor.

In the electrical component accommodation part 6, an auxiliary board 38 and a main board 61 are arranged at an interval in the front-rear direction. The main board is disposed at a rear end portion of the motor case 11. The auxiliary board 38 is supported by the DC motor 4 through connection elements 37, and is disposed at an intermediate portion of the motor case 11.

Each of the auxiliary board 38 and the main board 61 is provided in a circular shape. A size Φ2 of the auxiliary board is smaller than a diameter Φ1 of the fan mechanism 5 (Φ2<Φ1). Therefore, it is possible to prevent an air flow from being disturbed by the auxiliary board 38. The electrical components 6a are distributed on and attached to these auxiliary boards 38 and 61. By using the boards distributed and arranged as above, it becomes easy to cope with a high current.

A control program for controlling actuation of the DC motor 4 to operate the fan unit 1 is stored in the driving circuit.

Next, control of the actuation of the DC motor 4 and operation of the fan unit 1 will be described.

When operation of the cleaner 100 is started in accordance with a user's manipulation of a switch, a predetermined induced current is supplied to the stator 4c of the DC motor 4 according to control carried out by the driving circuit. Accordingly, the inner rotor 4a and the outer rotor 4b are guided to the predetermined start-up initiating positions.

Thereafter, when the inner rotor 4a and the outer rotor 4b are stopped at the start-up initiating positions and a start of the DC motor is initiated after the stopping, a current for positioning the inner rotor 4a and the outer rotor 4b at the start-up initiating positions and a current for starting the inner rotor and the outer rotor from a state in which the rotors are positioned at the start-up initiating positions are used, and thus power consumption is increased.

Therefore, in the fan unit 1 according to one embodiment of the present disclosure, a driving current is supplied to the stator 4c immediately before the inner rotor 4a and the outer rotor 4b are stopped at the startup initiating positions. In this way, it is possible to suppress consumption of the battery 8 caused by an excessively induced current and smoothly rotate the inner rotor 4a and the outer rotor 4b in opposite directions.

When the inner rotor 4a and the outer rotor 4b are rotated, the first fan 5a and the second fan 5b are also rotated in opposite directions in response to the rotation of the inner and outer rotors. Rotational speeds of the first fan 5a and the second fan 5b are controlled on the basis of the position information detected by the position sensor. Since the first fan 5a and the second fan 5b are configured as contra-rotating fans, it is possible to implement a higher static pressure and obtain a higher suction force (blowing force) than in the case of a single fan.

Since the electrical component accommodation part 6 constitutes a portion of the blowing path 15 in the fan unit 1, a cooling effect on the electrical components 6a can be obtained without providing a cooling device.

Figure 16:
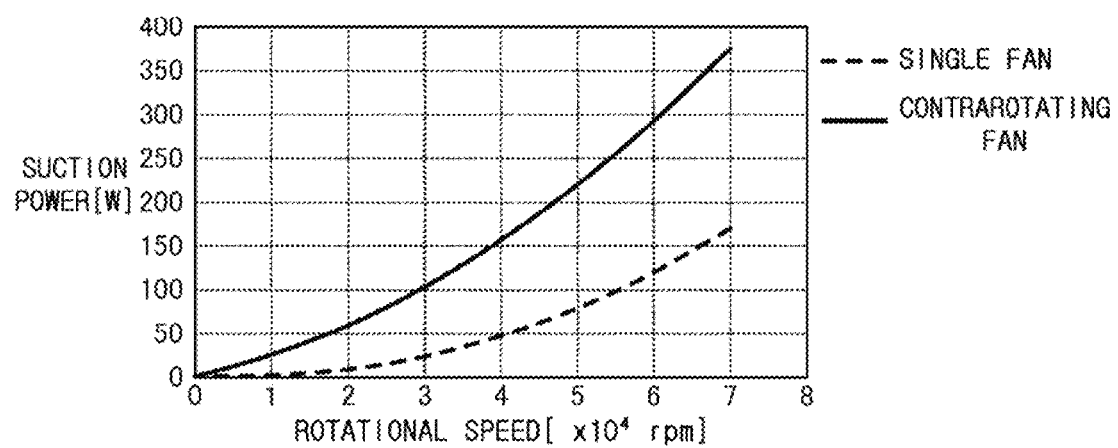
FIG. 16 is a view illustrating a result of measuring an air volume-static pressure characteristic of the contra-rotating fan.

A result of measuring an air volume-static pressure characteristic of the contra-rotating fan employed in the fan unit 1 is shown in FIG. 16. A comparative example is a conventional single fan (the first centrifugal fan in the embodiment). It can be seen that the contra-rotating fan can improve an overall air volume-static pressure characteristic when compared with the single fan.

In order to stabilize a start of the rotors, it is preferable for a difference between the start-up initiating position $\theta Ib$ of the inner rotor 4a and the start-up initiating position $\theta Ob$ of the outer rotor 4b to be as small as possible.

When a size difference of the air gap between the narrowest portion and the widest portion is small, an induced current is large, and problems such as demagnetization, current limit, or the like may occur. On the other hand, when the above difference is large, there is a problem in that magnetic efficiency is lowered. Therefore, it is preferable for an increased difference of the air gap to be set as 2.2 times the narrowest portion in the inner air gap and 2.8 times the narrowest portion in the outer air gap. In this way, an induced current can be set to −30 A, which is free from a problem such as demagnetization or and current limit.

Instead of the centrifugal fan, a mixed flow fan may be employed as the first fan 5a. The number of the main blades 52, the sub blades 53, and the axial flow blades 57 may be selected according to a specification. The first fan 5a and the second fan 5b may be configured to be rotated at different rotational speeds in the same direction.

A device to which the fan unit 1 may be applied is not limited to the cleaner 100. For example, the fan unit according to the present disclosure may be applied to a compact device that requires a powerful suction force or blowing force, such as an air conditioning facility, for example, an air conditioner.

According to the fan unit of the present disclosure, stable and highly efficient fan driving may be implemented and it is possible to provide a high-performance stick-type electric cleaner.

Although the present disclosure has been described with various embodiments, various changes and modifications may be suggested to one skilled in the art. It is intended that the present disclosure encompass such changes and modifications as fall within the scope of the appended claims.

What is claimed is:

1. A cleaner comprising a fan unit, wherein the fan unit comprises:
    a first fan and a second fan disposed in a line on a same rotation axis; and
    a driving motor configured to drive the first fan and the second fan, comprising:
        a first rotor connected to the first fan by a driving shaft,
        a second rotor connected to the second fan and comprises:
            a cylindrical outer core, and
            a plurality of magnets coupled to an inner circumferential surface of the cylindrical outer core, and
        a stator disposed between the first rotor and the second rotor,
    wherein the first rotor is disposed to face an inner circumferential surface of the stator,
    wherein the second rotor is disposed to face an outer circumferential surface of the stator,
    wherein the second fan is coupled to one end portion of the cylindrical outer core, and
    wherein the second fan is configured to be rotated in a direction opposite of a direction in which the first fan is rotated.

2. The cleaner according to claim 1, wherein at least one of the first fan or the second fan is an axial flow fan.

3. The cleaner according to claim 1, wherein at least one of the first fan or the second fan is a mixed flow fan or a centrifugal fan.

4. The cleaner according to claim 1, wherein an outer diameter of the first fan is smaller than that of the second fan.

5. The cleaner according to claim 1, wherein:
    the first rotor is an inner rotor located at an inner side of the stator in a radial direction; and
    the second rotor is an outer rotor located at an outer side of the stator in the radial direction.

6. The cleaner according to claim 5, wherein: a first air gap is formed between the stator and the first rotor,
    a second air gap is formed between the stator and the second rotor, and
    a size of any one of the first air gap and the second air gap varies in a circumferential direction of the stator.

7. The cleaner according to claim 1, wherein the driving motor is a single-phase brushless direct current (DC) motor.

8. The cleaner according to claim 5, further comprising:
    a sensor configured to detect a rotational position of any one of the first rotor and the second rotor; and
    a processor configured to control rotation of the first rotor and the second rotor on a basis of position information detected by the sensor.

9. The cleaner according to claim 8, wherein, when the driving motor is initially driven, the processor is configured to control an induced current to be supplied to the stator so that the first rotor and the second rotor are disposed at predetermined initiating positions.

10. The cleaner according to claim 9, wherein, in a state in which the first rotor and the second rotor are disposed at the predetermined initiating positions, electrical angles of both of the first rotor and the second rotor range between 0° and 180°.

11. The cleaner according to claim 9, wherein the processor is configured to control a current to be supplied to the stator before the first rotor and the second rotor are disposed at the predetermined initiating positions.

12. The cleaner according to claim 1, wherein:
    the first fan comprises a plurality of first blades,
    the second fan is spaced apart from the first fan and comprises a plurality of second blades, and
    a direction in which the plurality of first blades is inclined, with respect to the driving shaft of the driving motor, differs from a direction in which the plurality of second blades is inclined with respect to the driving shaft of the driving motor.

13. The cleaner according to claim 1, further comprising:
    a running section including a suction port; and
    a manipulation section connected to the running section, wherein:
        the fan unit is disposed in the manipulation section to generate a suction force for suctioning dust through the suction port,
        the fan unit further comprises a case having an inlet into which air is introduced and an exhaust port through which the air introduced through the inlet is discharged, and
        the first fan is disposed closer to the inlet than the second fan.

14. The cleaner according to claim 12, wherein the plurality of first blades comprises:
    a plurality of main blades each having a plate shape; and
    a plurality of sub blades each having a length smaller than that of the main blade,
    wherein the plurality of main blades and the plurality of sub blades are spaced apart from each other and alternately disposed in a circumferential direction of the first fan.

15. The cleaner according to claim 12, wherein the plurality of second blades are disposed to be inclined in a direction that differs from the direction in which the plurality of first blades are inclined.

16. The cleaner according to claim 12, wherein a length of the first fan is greater than that of the second fan in a direction in which the driving shaft of the driving motor extends.

* * * * *